United States Patent
Wang et al.

(10) Patent No.: US 11,609,560 B2
(45) Date of Patent: Mar. 21, 2023

(54) METHOD AND SYSTEM FOR MONITORING RAIL VEHICLE

(71) Applicant: CRRC QINGDAO SIFANG CO., LTD., Qingdao (CN)

(72) Inventors: Junyan Wang, Qingdao (CN); Tai Liu, Qingdao (CN); Jie Yang, Qingdao (CN); Chao Ma, Qingdao (CN); Yanhong Shi, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 615 days.

(21) Appl. No.: 16/316,086

(22) PCT Filed: Nov. 10, 2017

(86) PCT No.: PCT/CN2017/110378
§ 371 (c)(1),
(2) Date: Jan. 8, 2019

(87) PCT Pub. No.: WO2018/086573
PCT Pub. Date: May 17, 2018

(65) Prior Publication Data
US 2021/0286350 A1    Sep. 16, 2021

(30) Foreign Application Priority Data
Nov. 10, 2016   (CN) .......................... 201610991283.X

(51) Int. Cl.
*G05B 23/02*       (2006.01)
*B61L 27/50*       (2022.01)

(52) U.S. Cl.
CPC .......... *G05B 23/0283* (2013.01); *B61L 27/50* (2022.01); *G05B 23/0224* (2013.01)

(58) Field of Classification Search
CPC ............ G05B 23/0283; G05B 23/0224; B61L 27/0083
(Continued)

(56) References Cited

U.S. PATENT DOCUMENTS 6,480,810 B1    11/2002   Cardella
8,595,345 B2 *  11/2013   Wilson .................... H04L 67/26
                                                    709/223
(Continued)

FOREIGN PATENT DOCUMENTS

CN      102390383 A     3/2012
CN      102785681 A     11/2012
(Continued)

OTHER PUBLICATIONS

International Search Report for PCT/CN2017/110378 filed on Nov. 10, 2017; dated Jan. 26, 2018.

*Primary Examiner* — Son T Le
*Assistant Examiner* — Matthew W. Baca
(74) *Attorney, Agent, or Firm* — Cantor Colburn LLP

(57) ABSTRACT

A method and system for monitoring a rail vehicle are provided. The method includes: a local device acquires current operating data and historical operating data of a rail vehicle from a controller of the rail vehicle, herein the local device, which is connected with the controller, is a portable testing device; the local device obtains fault information according to the current operating data and the historical operating data, herein the fault information includes at least one of a fault code and a fault description; the local device obtains a maintenance plan corresponding to the fault information, herein the maintenance plan is obtained through a remote device or a server side; and the local device maintains the rail vehicle according to the maintenance plan. The disclosure solves a technical problem in the traditional art that a troubleshooting process of a rail vehicle is difficult, (Continued)

and when the rail vehicle has a fault, the fault cannot be solved timely.

17 Claims, 9 Drawing Sheets

(58) Field of Classification Search
USPC .......................................................... 701/29.1
See application file for complete search history.

(56) References Cited

U.S. PATENT DOCUMENTS

| | | | | |
|---|---|---|---|---|
| 10,055,217 | B2* | 8/2018 | Hong | ....................... H04L 67/34 |
| 2004/0167689 | A1* | 8/2004 | Bromley | ................ G07C 5/008 |
| | | | | 701/29.6 |
| 2006/0136104 | A1* | 6/2006 | Brozovich | .......... G06F 11/2294 |
| | | | | 701/31.4 |
| 2007/0006286 | A1* | 1/2007 | Singhal | ................... H04L 63/08 |
| | | | | 726/4 |
| 2014/0279707 | A1* | 9/2014 | Joshua | ............... G06Q 30/0283 |
| | | | | 701/1 |
| 2015/0066289 | A1* | 3/2015 | Sarkar | ..................... G06F 9/445 |
| | | | | 701/33.1 |
| 2015/0381941 | A1* | 12/2015 | Watkins | ................. G06V 20/59 |
| | | | | 348/148 |
| 2016/0104330 | A1* | 4/2016 | Rudenko | ............. G07C 5/0808 |
| | | | | 701/29.1 |
| 2016/0171791 | A1 | 6/2016 | Cervantes | |
| 2016/0292933 | A1* | 10/2016 | Sprock | ................... G06Q 50/08 |

FOREIGN PATENT DOCUMENTS

| | | | | |
|---|---|---|---|---|
| CN | 104181911 | A | | 12/2014 |
| CN | 104460644 | A | | 3/2015 |
| CN | 104503422 | A | | 4/2015 |
| CN | 104932487 | A | | 9/2015 |
| CN | 105159283 | A | | 12/2015 |
| CN | 105404273 | A * | 3/2016 | ......... G05B 23/0259 |
| CN | 105404273 | A | | 3/2016 |
| CN | 105629964 | A | | 6/2016 |
| CN | 105872473 | A | | 8/2016 |
| CN | 106444584 | A | | 2/2017 |
| CN | 106506645 | A | | 3/2017 |
| JP | 8268284 | A | | 10/1996 |
| JP | 200219606 | A | | 1/2002 |
| JP | 2002132333 | A | | 5/2002 |
| JP | 2002329020 | A | | 11/2002 |
| JP | 2005255115 | A | | 9/2005 |
| JP | 2011134224 | A | | 7/2011 |
| JP | 2012198644 | A | | 10/2012 |
| JP | 201651413 | A | | 4/2016 |
| JP | 201681241 | A | | 5/2016 |
| KR | 1020130024664 | A | | 3/2013 |
| KR | 1020150069061 | A | | 6/2015 |
| WO | 0133513 | A1 | | 5/2001 |

\* cited by examiner

METHOD AND SYSTEM FOR MONITORING RAIL VEHICLE

FIELD

The disclosure relates to the field of monitoring a rail vehicle, and in particular to a method and system for monitoring a rail vehicle.

BACKGROUND

At disclosure, a system for monitoring and maintaining a rail vehicle generally includes a vehicle device and a ground device. The vehicle device is configured to send fault information and operating state information of the rail vehicle wirelessly to the ground device. The ground device is equipped with a ground expert database, and is configured to receive the fault information and the operating state information of the rail vehicle wirelessly, determine whether a fault indicated by the fault information of the rail vehicle matches to a fault pre-stored in the ground expert database, and in case of a match, extract a corresponding fault solving policy from the ground expert database, and send the fault solving policy wirelessly to the vehicle device through a first transmitter. But the troubleshooting process of the existing system is extremely difficult, a difficult problem cannot be solved in time, it is difficult to describe in seeking help, and a fault is solved slowly.

Aiming at a problem in the traditional art that a troubleshooting process of a rail vehicle is difficult, and when the rail vehicle has a fault, the fault cannot be solved timely, no effective solution has been proposed yet.

SUMMARY

The embodiments of the disclosure provide a method and system for monitoring a rail vehicle, for at least solving a technical problem in the traditional art that the troubleshooting process of a rail vehicle is difficult, and when the rail vehicle has a fault, the fault cannot be solved timely.

According to an aspect of the embodiments of the disclosure, a method for monitoring a rail vehicle is provided. The method includes: a local device acquires current operating data and historical operating data of the rail vehicle from a controller of the rail vehicle, herein the local device, which is connected with the controller, is a portable testing device; the local device obtains fault information according to the current operating data and the historical operating data, herein the fault information includes at least one of a fault code and a fault description; the local device obtains a maintenance plan corresponding to the fault information, herein the maintenance plan is obtained through a remote device or a server side; and the local device maintains the rail vehicle according to the maintenance plan.

According to another aspect of the embodiments of the disclosure, a system for monitoring a rail vehicle is also provided. The system includes: a local device and a server side or a remote device. The local device is connected with a controller of the rail vehicle, and is configured to acquire current operating data and historical operating data of the rail vehicle from the controller, and obtain fault information according to the current operating data and the historical operating data, wherein the fault information includes a fault code and a fault description. The local device is a portable testing device. The server side or the remote device is connected with the local device, and is configured to send a maintenance plan corresponding to the fault information. The local device is further configured to maintain the rail vehicle according to the maintenance plan.

In the embodiments of the disclosure, the local device acquires the current operating data and the historical operating data of the rail vehicle, obtains the fault information according to the current operating data and the historical operating data, obtains the maintenance plan corresponding to the fault information through the remote device or the server side, and maintains the rail vehicle according to the maintenance plan, thereby implementing monitoring and maintenance to the rail vehicle. It is easy to be noted that after obtaining the fault information, the local device may obtain the maintenance plan corresponding to the fault information through the server side or the remote device, so in case of a problem, the maintenance plan may be obtained timely, a solution may be sought conveniently and efficiently, and the technical problem in the traditional art that a troubleshooting process of a rail vehicle is difficult, and when the rail vehicle has a fault, the fault cannot be solved timely. Therefore, an effect of finding out and solving the fault of a rail vehicle in time may be achieved through the solution provided by the embodiments of the disclosure.

BRIEF DESCRIPTION OF THE DRAWINGS

The accompanying drawings described here are used for providing further understanding of the disclosure, and constitute a part of the disclosure application. Schematic embodiments of the disclosure and description thereof are used for illustrating the disclosure and not intended to form an improper limit to the disclosure. In the accompanying drawings.

DETAILED DESCRIPTION OF THE EMBODIMENTS

In order to make those skilled in the art understand the solutions of the disclosure better, the technical solutions in the embodiments of the disclosure are clearly and completely elaborated below in combination with the accompanying drawings. It is apparent that the described embodiments are only a part of the embodiments of the disclosure but not all. Based on the embodiments of the disclosure, all the other embodiments obtained by those of ordinary skill in the art on the premise of not contributing creative effort should belong to the protection scope of the disclosure.

It is to be noted that the terms like "first" and "second" in the specification, claims and accompanying drawings of the disclosure are used for differentiating the similar objects, but do not have to describe a specific order or a sequence. It should be understood that the objects may be exchanged under appropriate circumstances, so that the embodiments of the disclosure described here may be implemented in an order different from that described or shown here. Moreover, the terms like "include" and "have" and any variation of them are intended to cover nonexclusive including; for example, the process, method, system, product or device including a series of steps or units do not have to be limited to those clearly listed steps or units, but may include other steps or units which are not clearly listed or inherent in these process, method, system, product or device.

First Embodiment

According to the embodiments of the disclosure, an embodiment of a method for monitoring a rail vehicle is provided. It is to be noted that these steps presented in the flowchart of the accompanying drawings can be executed in a computer system like a group of computer executable instructions, and moreover, although a logical sequence is shown in the flowchart, in some cases, the presented or described steps can be performed in a sequence different from that described here.

Figure 1:
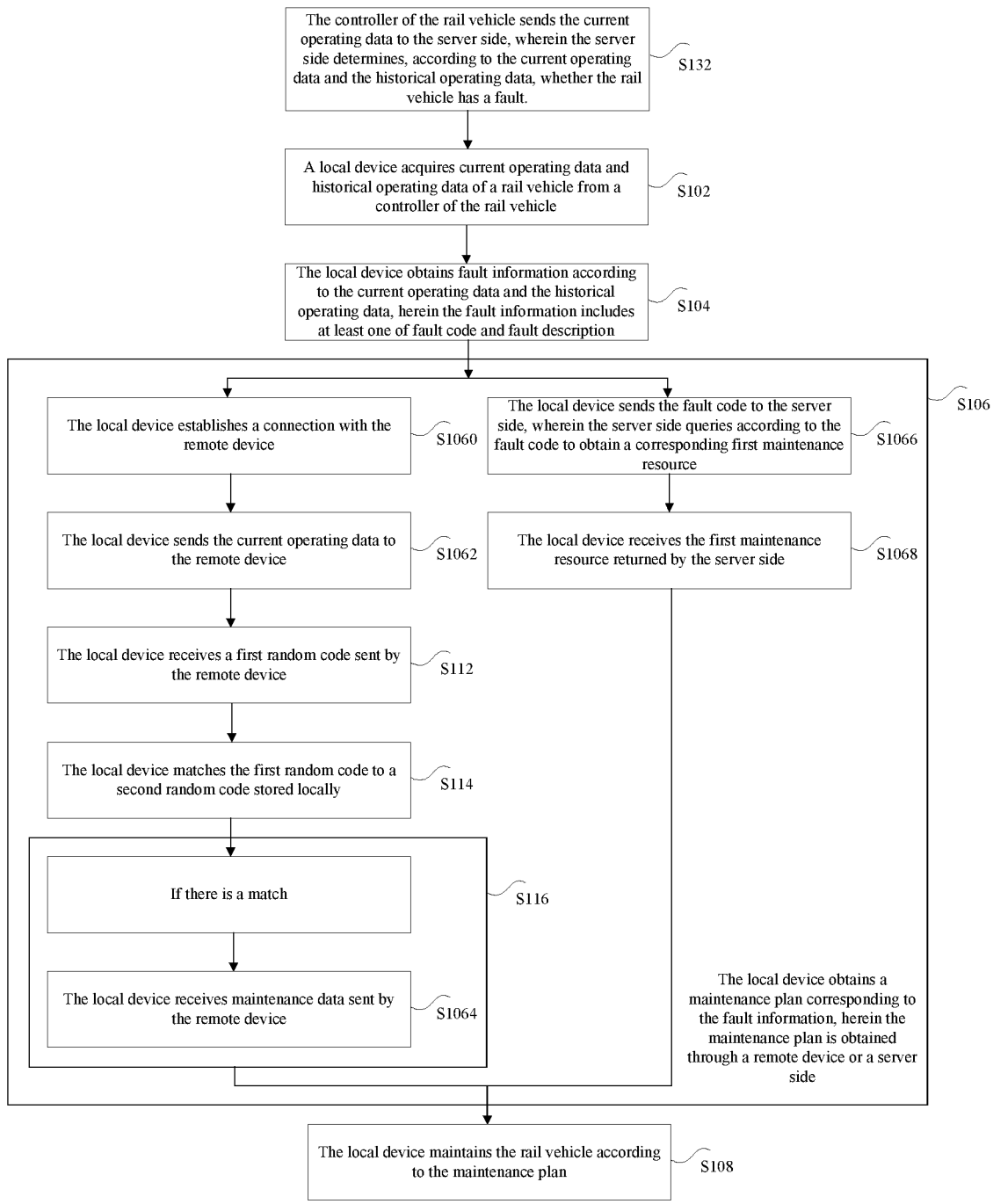
FIG. 1 is a flowchart of a method for monitoring a rail vehicle according to an embodiment of the disclosure.

FIG. 1 is a flowchart of the method for monitoring a rail vehicle according to an embodiment of the disclosure. As shown in FIG. 1, the method includes the following steps.

At S102, a local device acquires current operating data and historical operating data of a rail vehicle from a controller of the rail vehicle, herein the local device, which is connected with the controller, is a portable testing device.

Specifically, the local device may be a portable testing device (PTU device), for example, a portable laptop, on which Portable Testing Unit (PTU) service software is installed. The current operating data and the historical operating data may include a driver instruction, a train speed, motor voltage, motor current, and other process data, and may also include state information of the rail vehicle, for example, emergency braking, and automatic tripping of a high-speed circuit breaker.

At S104, the local device obtains fault information according to the current operating data and the historical operating data, herein the fault information includes at least one of fault code and fault description.

Specifically, the fault information may include: a fault code, a fault description, a fault level, a fault date, and a number of the rail vehicle having a fault.

In an alternative solution, field maintenance personnel may carry the PTU device to the train, and then directly connects the PTU device with the controller of the rail vehicle, reads the current operating data and the historical operating data of the rail vehicle from the controller, analyzes the current operating data and the historical operating data, and diagnoses the fault information of the rail vehicle to obtain the fault information of the rail vehicle.

At S106, the local device obtains a maintenance plan corresponding to the fault information, herein the maintenance plan is obtained through a remote device or a server side.

In an alternative solution, after the field maintenance personnel obtained the fault information of the rail vehicle, if the field maintenance personnel encounter a problem difficult to solve, they may input the fault code; then, the PTU device queries a corresponding maintenance case from a database of the server side, and acquires data of the maintenance case from the server side. When encountering the problem difficult to solve, the field maintenance personnel may also connect the remote device to apply for an expert to perform remote maintenance, and obtain the maintenance plan.

At S108, the local device maintains the rail vehicle according to the maintenance plan.

In an alternative solution, after the PTU device receives the maintenance plan returned by the server side or the remote device, the maintenance plan may be displayed on a display of the PTU device for the field maintenance personnel to view. The field maintenance personnel may maintain the rail vehicle according to the maintenance plan, thereby eliminating the fault of the rail vehicle.

According to the above embodiment of the disclosure, the local device acquires the current operating data and the historical operating data of the rail vehicle, obtains the fault information according to the current operating data and the historical operating data, obtains the maintenance plan corresponding to the fault information through the remote device or the server side, and maintains the rail vehicle according to the maintenance plan, thereby implementing monitoring and maintenance to the rail vehicle. It is easy to be noted that after obtaining the fault information, the local device may obtain the maintenance plan corresponding to the fault information through the server side or the remote device, so in case of a problem, the maintenance plan may be obtained timely, a solution may be sought conveniently and efficiently, and the technical problem in the traditional art that a troubleshooting process of a rail vehicle is difficult, and when the rail vehicle has a fault, the fault cannot be solved timely. Therefore, an effect of finding out and solving the fault of a rail vehicle in time may be achieved through the solution provided by the embodiments of the disclosure.

Alternatively, in the above embodiment of the disclosure, the maintenance plan is obtained through the remote device in S106 may further include the following steps.

At S1060, the local device establishes a connection with the remote device, wherein the remote device is one of the portable testing device, a Web side device, and a mobile side device.

Specifically, the remote device may be the portable testing device (PTU device), the Web side device, and the mobile side device. For example, the portable testing device may be a portable laptop on which the PTU service software is installed; the Web side device may be the portable laptop, a tablet PC, an IPAD or a Personal Digital Assistant (PDA); the mobile side device may be a smartphone (including an Android phone or an iOS phone), a tablet PC or a PDA.

In an alternative solution, the PTU device of the field maintenance personnel may establish a remote connection with a Web side device of the expert through a wireless network.

At S1062, the local device sends the current operating data to the remote device.

In an alternative solution, after the PTU device of the field maintenance personnel establishes the remote connection with the Web side device of the expert, the expert may view, through the Web side device, the operating data that the field maintenance personnel views through the PTU device; that is, the acquired current operating data may be sent to the Web side device of the expert through vehicle and ground wireless devices, and then the expert may view the data of the PTU device, modify a controller variable, and perform maintenance operations like uploading software through the PTU device.

At S1064, the local device receives maintenance data sent by the remote device, wherein the maintenance data includes one of controller variable and software data.

In an alternative solution, after viewing the current operating data, the expert may modify the controller variable of the rail vehicle, and perform the maintenance operations like uploading software; that is, the expert may send the modified controller variable and software of the controller to the PTU device, and the PTU device sends the controller variable and the software to the controller of the rail vehicle, thereby implementing modification to the controller. After the rail vehicle is maintained, the field maintenance personnel may break the remote connection with the Web side device through the PTU device.

Through the above steps S1060 to S1064, it is possible to obtain the maintenance plan and maintain the rail vehicle through the remote device, thereby achieving the purpose of obtaining a remote instruction from the expert.

Alternatively, in the above embodiment of the disclosure, the local device establishes the connection with the remote device in S1060 may further include the following steps.

At S10601, the local device sends a maintenance request carrying the fault description to the server side, herein the server side sends the maintenance request to the remote device.

At S10602, the local device receives a connection request sent by the remote device.

At S10603, the local device confirms the connection request, and establishes the connection with the remote device.

In an alternative solution, when needing the expert to provide the remote guidance, the field maintenance personnel may write the fault description through the PTU device. The PTU device establishes the connection with the server, and may send the maintenance request to the server; then, the server forwards the maintenance request to the Web side device that has established the connection with the server. An online expert may view the fault description from the Web side. When the online expert may solve the fault, the online expert may initiate the connection request through the Web side device, and send the connection request to the server; and then, the server forwards the connection request to the PTU device of the field maintenance personnel. After viewing information about the expert sending the connection request through the PTU device, the field maintenance personnel may establish a remote maintenance connection with the Web side device after confirming the connection request.

Alternatively, in the above embodiment of the disclosure, the local device establishes the connection with the remote device in S1060 may further include the following steps.

At S10604, the local device sends the maintenance request carrying the fault description to the remote device.

At S10605, the local device receives the connection request sent by the remote device.

At S10606, the local device confirms the connection request, and establishes the connection with the remote device.

In an alternative solution, when needing the expert to provide the remote guidance, the field maintenance personnel may write the fault description through the PTU device, and select the online expert that has established connection with the server. The PTU device establishes the connection with the server, and may send the maintenance request including the fault description to the server; then, the server forwards the maintenance request to the Web side device of the corresponding online expert. The online expert may view the fault description through the Web side device. When the online expert may solve the fault, the online expert may initiate the connection request through the Web side device, and send the connection request to the server; and then, the server forwards the connection request to the PTU device of the field maintenance personnel. After viewing information about the expert sending the connection request through the PTU device, the field maintenance personnel may establish the remote maintenance connection with the Web side device after confirming the connection request.

Alternatively, in the above embodiment of the disclosure, before the local device receives the maintenance data sent by the remote device in S1064, the method further includes the following steps.

At S112, the local device receives a first random code sent by the remote device.

At S114, the local device matches the first random code to a second random code stored locally.

At S116, if there is a match, the local device receives the maintenance data sent by the remote device.

The first random code and the second random code are generated by the server side.

It is to be noted that a remote maintenance function has a great influence on the rail vehicle, and a safety requirement is very high, so the following ways may be used to ensure safety: the safety of a ground server and network transmission is ensured technically; the safety is ensured from an operation process, that is, all operations with a high risk like connecting the PTU remotely, modifying the controller variable, and uploading the software may only be performed after being confirmed by the field maintenance personnel, and the process must be completed through a manual operation instead of being automatically completed by the system; a safety assistance is added, and a temporary authorization mechanism is adopted.

In an alternative solution, an operation random code may be generated by the server side, and transmitted to the PTU device of the field maintenance personnel and the Web side device of the remote expert. The Web side device sends the first random code to the PTU device. The field maintenance personnel may check the second random code sent by the server and the first random code sent by the Web side device. Only after confirming the random codes, the field maintenance personnel may receive the maintenance data sent by the Web side device, and modify the controller of the rail vehicle according to the maintenance data, thereby implementing the modification to the controller.

Alternatively, in the above embodiment of the disclosure, the maintenance plan is obtained through the server side in S106 may further include the following steps.

At S1066, the local device sends the fault code to the server side, wherein the server side queries according to the fault code to obtain a corresponding first maintenance resource, wherein the first maintenance resource includes at least one of a video resource and an image resource.

Specifically, the maintenance resource returned by the server side may include data of the maintenance case, guidance videos, and textual and graphic information.

At S1068, the local device receives the first maintenance resource returned by the server side.

In an alternative solution, when encountering the problem difficult to solve, the field maintenance personnel may input the fault code, and send the fault code to the server connected with the PTU device. The server queries the maintenance case, the guidance videos, and the textual and graphic information corresponding to the fault code. The PTU device displays the data of the maintenance case acquired from the server side on the display of the PTU device. The field maintenance personnel may check, according to the acquired maintenance case, the systems or devices which may have a problem, and find, corresponding to the current operating data of the rail vehicle, a breakthrough in solving the problem.

Through the above steps S1066 to S1068, it is possible to obtain the maintenance plan and maintain the rail vehicle through the service side, thereby achieving the purpose of building a fault knowledge base management system.

Alternatively, in the above embodiment of the disclosure, after the local device sends the fault code to the server side in S1066, the method further includes the following steps.

At S116, the server side performs permission validation to the local device.

At S118, if the permission validation of the local device is successful, the server side queries according to the fault code to obtain the first maintenance resource.

In an alternative solution, after receiving the fault code sent by the PTU device, the server side may perform the permission validation to the PTU device to validate whether the PTU device has a permission of querying the maintenance case. If the PTU device has the permission of querying the maintenance case, then the permission validation to the PTU device is successful, and the server returns the corresponding first maintenance resource queried to the PTU device for the field maintenance personnel to view.

Through the above steps S116 to S118, the server side may validate the local device, and only the local device which is validated successfully may obtain the maintenance case, thereby enhancing the safety of maintaining the rail vehicle.

Alternatively, in the above embodiment of the disclosure, after the local device receives the maintenance resource returned by the service side in S1068, the method further includes the following steps.

At S120, the local device acquires a second maintenance resource in a maintenance process, herein the second maintenance resource includes at least one of the video resource and the image resource.

At S122, the local device uploads the second maintenance resource to the server side, herein the server side stores the second maintenance resource.

In an alternative solution, the field maintenance personnel may use a multimedia characteristic of the PTU device to take videos and photos of an important maintenance work site, thereby obtaining the second maintenance resource, and upload the second maintenance resource to the server side through a network. The server side stores the second maintenance resource sent by the field maintenance personnel in a database for the maintenance personnel to view later.

Through the above steps S120 to S122, when fulfilling a task of maintaining the rail vehicle, the field maintenance personnel may write a maintenance case and upload it to the server side, thereby providing technical experience for the maintenance personnel later.

Alternatively, in the above embodiment of the disclosure, before the server side stores the second maintenance resource in S122, the method further includes the following steps.

At S124, the server side sends the second maintenance resource to the remote device, wherein the remote device generates an audit result according to the second maintenance resource, and the audit result includes one of the following: the audit is passed, and the audit is not passed.

At S126, the server receives the audit result sent by the remote device.

At S128, if the audit result is the audit is passed, the server side stores the second maintenance resource.

At S130, if the audit result is the audit is not passed, the server side deletes the second maintenance resource.

In an alternative solution, after the field maintenance personnel sends the second maintenance resource to the server side through the PTU device, the server side forwards the second maintenance resource to a remote Web device, and management personnel may audit the second maintenance resource. If the audit of the second maintenance resource is passed, the management personnel send the audit result to the server side through the Web device; and after receiving the audit result, the server side may store the second maintenance resource in the database. If the audit of the second maintenance resource is not passed, the management personnel send the audit result to the server side through the Web device; and after receiving the audit result, the server side deletes the second maintenance resource.

It is to be noted that if the field maintenance personnel are technical personnel, the server may directly save the received second maintenance resource; if the field maintenance personnel are ordinary personnel, the server needs to forward the second maintenance resource to the remote device for audit. The second maintenance resource is saved only after the audit is passed.

Alternatively, in the above embodiment of the disclosure, before the local device acquires the current operating data and the historical operating data of the rail vehicle in S102, the method further includes the following steps.

At S132, the controller of the rail vehicle sends the current operating data to the server side, wherein the server side determines, according to the current operating data and the historical operating data, whether the rail vehicle has a fault.

Specifically, the server side may include the servers of two corporations, namely the server of a rail vehicle operation corporation and the server of a rail vehicle manufacture corporation.

Figure 2:
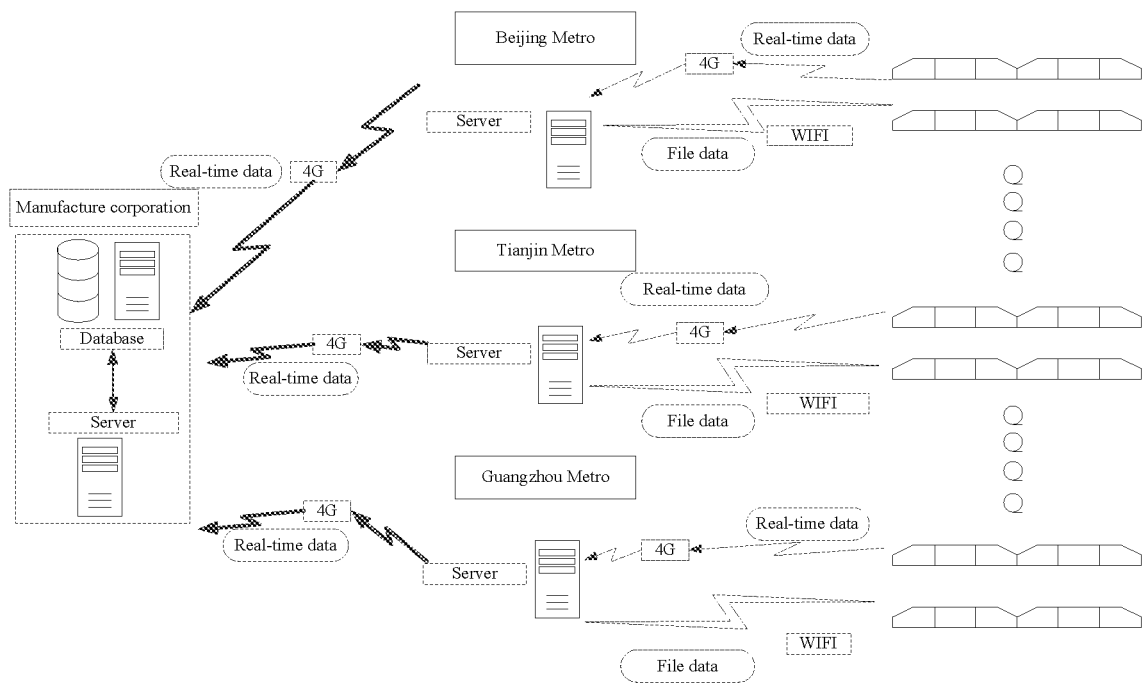
FIG. 2 is an alternative schematic diagram of a server side according to an embodiment of the disclosure.

In an alternative solution, in order to enable the rail vehicle operation corporation and the rail vehicle manufacture corporation to monitor a rail at the same time for facilitating maintenance instructing work of the fault of the rail vehicle, the controller of the rail vehicle may transmit the current operating data to the servers of the two corporations through a WIFI network or the 4 Generation mobile communication technology (4G) network, then the server side may determine, according to the received current operating data and historical operating data, whether the rail vehicle has a fault. As shown in FIG. 2, the rail vehicle sends, through the WIFI or the 4G real-time data to the server of the manufacture corporation, the server of Beijing metro, the server of Tianjin metro, the server of Guangzhou metro.

Through S132, the operating data may be monitored in real time by sending the operating data to the server side.

Alternatively, in the above embodiment of the disclosure, before the local device acquires the current operating data and the historical operating data of the rail vehicle in S102, the method further includes the following steps.

At S134, the local device acquires the train data sent by the controller of the rail vehicle, wherein the train data includes at least one of the following: a number, a password, a display screen number and a wheel diameter of the rail vehicle.

At S136, the local device modifies the train data, and obtains the modified train data.

At S138, the local device returns the modified train data to the controller, wherein the controller displays the modified train data.

In an alternative solution, the field maintenance personnel may implement a function of setting the train data by directly connecting the PTU device with the rail vehicle. The field maintenance personnel may acquire, through the PTU device, the number, password, display screen number, wheel diameter and other data sent by the controller of the rail vehicle. The field maintenance personnel may modify the data of the rail vehicle, and return the modified data to the controller. After the operation is finished, the train data in the controller may be read and displayed through the display.

Alternatively, in the above embodiment of the disclosure, before the local device acquires the current operating data and the historical operating data of the rail vehicle in S102, the method further includes the following steps.

At S140, the local device displays a testing software list interface of testing software, wherein names of multiple pieces of testing sub-software are displayed in the testing software list.

Specifically, multiple pieces of testing sub-software may be the testing software of multiple subsystems in the rail vehicle.

At S142, the local device receives the name of selected testing sub-software, and performs a test corresponding to the selected testing sub-software.

In an alternative solution, the field maintenance personnel may implement a function of testing a subsystem PTU module of the train by directly connecting the PTU device with the controller of the rail vehicle. The test of the subsystem PTU module is completed by calling subsystem testing software. The field maintenance personnel may display, through the PTU device, the testing software list including the testing sub-software of each subsystem. The field maintenance personnel may select the test needing to be done by clicking the name of the testing sub-software. After receiving the testing sub-software, the PTU device may control the corresponding subsystem to perform the corresponding test.

Alternatively, in the above embodiment of the disclosure, before the local device displays the testing software list interface of the testing software in S140, the method further includes the following steps.

At S144, after being connected with the server, the local device detects whether the testing software needs to be updated.

At S146, if it is detected that the testing software needs to be updated, the local device displays an update prompt in a testing interface.

At S148, after receiving an update instruction, the local device updates the testing software.

In an alternative solution, before testing the subsystem, the field maintenance personnel needs to detect, through the PTU device, the testing software in the controller, that is, after being connected with the server side, the PTU device requests for a version number of the testing software, and compares the version number with a version number of the local testing software. If there is an update, a prompt may be given after the field maintenance personnel enters a software page of the PTU device. After the testing software of the controller is updated, the field maintenance personnel may start the testing sub-software from the testing software list to perform testing. The PTU device runs in background when the testing software runs.

Through the above steps S144 to S148, before the subsystem of the rail vehicle is tested, the testing software may be updated, thereby ensuring the effectiveness of the local testing software.

Alternatively, in the above embodiment of the disclosure, before the local device acquires the current operating data and the historical operating data of the rail vehicle in S102, the method further includes the following steps.

At S150, the local device receives a first production means list sent by the server side, wherein the first production means list includes at least two first production means files.

At S152, the local device compares the first production means list with a second production means list, and obtains a comparison result, wherein the second production means list includes at least two second production means files.

At S154, the local device updates the second production means list according to the comparison result.

Each first production means file and each second production means file include at least one of the following: a CAD drawing, a maintenance manual, a quality manual, and an instruction book.

Specifically, a production support mainly includes train debugging test, and query and management of the production means. The production means include the CAD drawing, the maintenance manual, the quality manual, the instruction book and other related means. The files are managed according to a relevant rule, so as to be convenient for users to view. For the query and management of the production means, the production means may be queried according to the class of the means, the type of the production file, the date of the file, and other key words; the production means of a certain train type and a certain device type may also be queried.

In an alternative solution, after the connecting the PTU device with the server side, the field maintenance personnel may obtain at least two first production means files from the server, and compare the plurality of first production means files obtained from the server with the local plurality of second production means files of the PTU device. It can be determined by comparing the first production means list and the second production means list, and the version numbers of each first production means file and each second production means file. If the local second production means list is different from the first production means list obtained by the server, the local second production means are updated, thereby ensuring the effectiveness and timeliness of the production means of the PTU device.

Alternatively, in the above embodiment of the disclosure, the local device updates the second production means list according to the comparison result in S154 may further include:

At S1542, the local device marks, according to the comparison result, state information of a second production means to be processed, wherein the state information is one of download, update and deletion.

At S1544, the local device processes the second production means to be processed according to the state information.

At S1546, the local device updates the second production means list.

In an alternative solution, if the first production means files in the first production means list are more than the second production means files in the second production means list, the production means files not in the second production means list are marked to be downloaded, and a download button is displayed on the right of the second production means list. The field maintenance personnel may download, by clicking the download button, the corresponding production means file from the server, and update the local second production means list. If the version number of one first production means file in the first production means list is different from the version number of the corresponding second production means file in the second production means list, the second production means file is marked to be updated, and a display button is displayed on the right of the second production means list. The field maintenance personnel may download, by clicking the display button, the corresponding production means file from the server, update the local second production means files, and update the local second production means list. If the first production means files in the first production means list are less than the second production means files in the second production means list, the redundant production means files in the second production means list are marked to be deleted, and a deletion button is displayed on the right of the second production means list. The field maintenance personnel may delete, by clicking the deletion button, the local second production means files of the PTU device, and update the local second production means list.

Alternatively, in the above embodiment of the disclosure, after it is determined that the rail vehicle has a fault, the method further includes the following step.

At S156, the remote device receives a push message of the server side, wherein the push message includes at least one of a fault message and a check-out and check-in message.

At S158, the remote device displays the push message.

In an alternative solution, users of the mobile side device may set, according to their own actual needs, the push message needing to be received, for example, the key information like fault push, and check-out and check-in push, so as to carry out the maintenance work accurately and efficiently. It is also possible to set pushing all information, then the users may receive all the information pushed by the server.

Alternatively, in the above embodiment of the disclosure, before the remote device receives the push message of the server side in S156, the method further includes the following steps.

At S160, the server side validates the remote device.

At S162, if the remote device is validated successfully, the server pushes the corresponding push message to the remote device, wherein the push message at least includes: a historical push message.

In an alternative solution, when the users of the mobile side device logs in, the server side may validate the mobile side device. After it is validated that the login of the mobile side device is successful, the server side pushes the push message before the login to the mobile side device, after that, when the server side detects there is a new message needing to be pushed, if the information belongs to the key information to be pushed, for example, the fault information and notice of meeting, the server side may push the new information to the login user who has a permission to view the information, and directly push the new information to the mobile side device. The mobile side device may receive the push message through a network interface, and pop up a note to notify the users that there is a new push message arriving; then, the users may click the note to view until logging out.

It is to be noted that a push function is implemented by mainly using an XMPP protocol, a Mina frame, and an AndroidPN frame. When a major fault occurs, a function of SMS prompt may be added.

Alternatively, in the above embodiment of the disclosure, after the remote device displays the push message in S158, the method further includes the following steps.

At S164, after receiving a view instruction, the remote device displays pushed contents corresponding to the push message.

The pushed contents corresponding to the fault message at least include: the fault code, the fault description, the fault level, a fault vehicle, a fault device, time of fault occurring, and a fault guidance; the pushed contents corresponding to the check-out and check-in message at least include: a serial number of a train, a train number, a train model, and check-out and check-in time of a train.

In an alternative solution, when the users of the mobile side device click a message notification, a corresponding message notification page pops up, so as to be convenient for the users to view related information. After entering a detailed fault push interface, the users may view the fault code, the fault description, the fault level, the fault vehicle, the fault device, the time of fault occurring, and the fault guidance; after entering a detailed check-out and check-in push interface, the users may view the serial number of a train, the train number, the train model, the check-out and check-in time of a train, and other information.

It is to be noted that a function of train debugging test is a particular function of the PTU side, mainly providing a support for the production of a debugging workshop. According to a train test program, train test contents are preset in the PTU side. By querying/setting the controller variable, test personnel are guided to operate a train device and complete a debugging test of the train. Because this function may only be used in the debugging workshop, the PTU side may be designed as debugging and maintaining versions; in the maintaining version, this function is removed.

By taking that the local device is the PTU side device, the remote device is the Web side device, and the server side is the ground server of the production unit of the rail vehicle for example, an optimal method for monitoring a rail vehicle in the disclosure is elaborated below in combination with the accompanying drawings FIG. 3 to FIG. 8.

Figure 3:
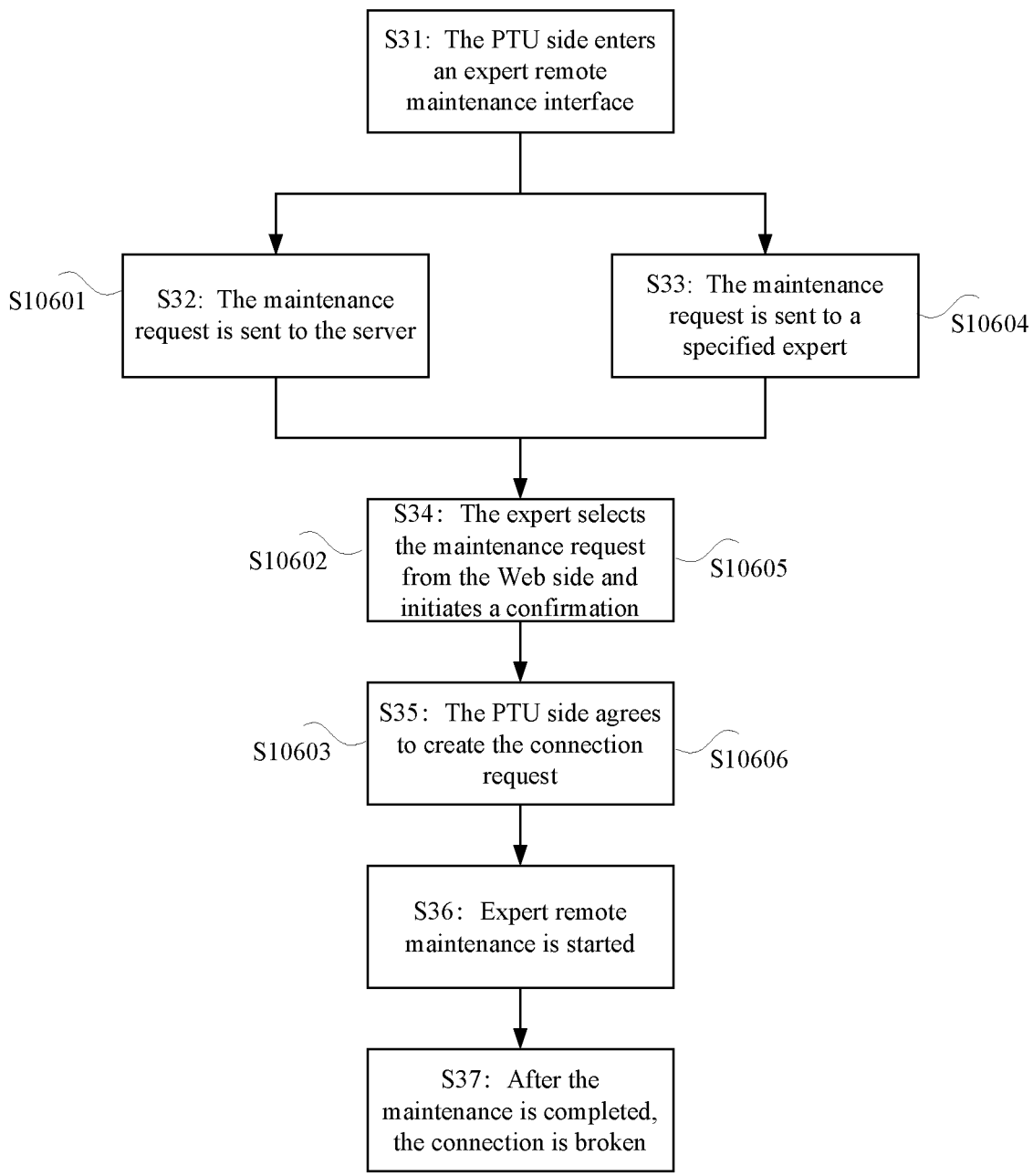
FIG. 3 is an alternative flowchart of obtaining a maintenance plan through a remote device according to an embodiment of the disclosure.

As shown in FIG. 3, the method may include the following steps.

At S31, the PTU side enters an expert remote maintenance interface.

Alternatively, when needing the expert to maintain remotely, the field maintenance personnel may enter the expert remote maintenance interface through the PTU device. After entering the expert remote maintenance interface, the field maintenance personnel may not specify an expert, then the process proceeds to S32; the field maintenance personnel may specify the expert, then the process proceeds to S33.

At S32, the maintenance request is sent to the server.

Alternatively, the field maintenance personnel may send the maintenance request to the server connected with the PTU device, and then the server forwards the maintenance request to all the online experts. The maintenance request includes fault description information.

At S33, the maintenance request is sent to a specified expert.

Alternatively, the field maintenance personnel may select the online expert, and sends the maintenance request to the server connected with the PTU device. The maintenance request includes the fault description information.

At S34, the expert selects the maintenance request from the Web side and initiates a confirmation.

Alternatively, after receiving the maintenance request sent by the server or the PTU device, the online expert may select the maintenance request from the Web side and initiates the connection request; the connection request is returned to the server, and the server returns the connection request to the PTU device; or, the connection request is returned to the PTU device.

At S35, the PTU side agrees to create the connection request.

Alternatively, after the PTU side receives the connection request of the Web side, if the field maintenance personnel passes the connection request, the remote connection between the PTU device and the Web side device is established.

At S36, expert remote maintenance is started.

Alternatively, after the remote connection between the PTU device and the Web side device is established, the expert may view the data of the PTU side through the Web side device, and perform the maintenance operations like modifying the controller variable and uploading software through the PTU device.

At S37, after the maintenance is completed, the connection is broken.

Alternatively, after the remote maintenance is completed, the field maintenance personnel may break the remote connection with the Web side device through the PTU device.

Figure 4:
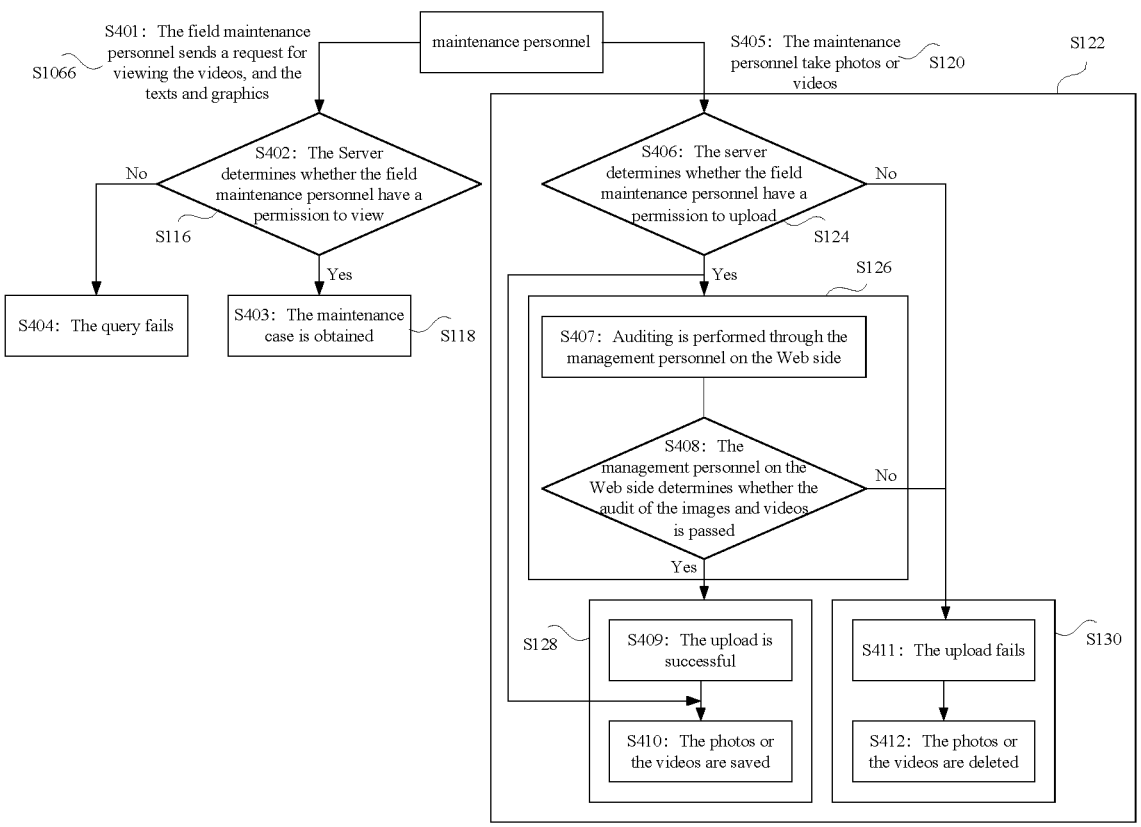
FIG. 4 is an alternative flowchart of obtaining a maintenance plan through the server side according to an embodiment of the disclosure.

As shown in FIG. 4, the method may include the following steps.

At S401, the field maintenance personnel sends a request for viewing the videos, and the texts and graphics.

Alternatively, the field maintenance personnel may send the request through the PTU device, and send the fault code to the server.

At S402, the server determines whether the field maintenance personnel have a permission to view.

Alternatively, after receiving the fault code, the server performs the permission validation to the PTU device, that is, determines whether the field maintenance personnel have a permission to view the videos, and the texts and graphics. If the field maintenance personnel have the permission to view, the process proceeds to S403; if the field maintenance personnel do not have the permission to view, the process proceeds to S404.

At S403, the maintenance case is obtained.

Alternatively, the PTU device obtains the maintenance case corresponding to the fault code from the database of the server.

At S404, the query fails.

At S405, the maintenance personnel take photos or videos.

Alternatively, after completing the maintenance, the field maintenance personnel may take, through the PTU device, photos or videos of a maintenance site or a maintenance process, and upload the images or videos to the server.

At S406, the server determines whether the field maintenance personnel have a permission to upload.

Alternatively, after receiving the images or videos uploaded by the PTU device, the server performs the permission validation to the PTU device, that is, determines whether the field maintenance personnel have the permission to upload. If the field maintenance personnel have the permission to upload, the process proceeds to S407 or S410;

if the field maintenance personnel is not the technical personnel, the process proceeds to S407; if the field maintenance personnel is the technical personnel, the process proceeds to S410; if the field maintenance personnel do not have the permission to upload, the process proceeds to S411.

At S407, auditing is performed through the management personnel on the Web side.

Alternatively, if the field maintenance personnel is not the technical personnel, but have the permission to upload, after receiving the images and videos uploaded by the PTU device, the server may send the images and videos uploaded by the PTU device to the Web side device, and then the management personnel performs the audit to the images and videos.

At S408, the management personnel on the Web side determines whether the audit of the images and videos is passed.

Alternatively, the management personnel on the Web side performs the audit to the images and videos uploaded by the PTU device; if the audit is passed, the process proceeds to S409; if the audit is not passed, the process proceeds to S411.

At S409, the upload is successful.

Alternatively, if the audit is passed, the server determines that the PTU device succeeds in uploading the images or videos.

At S410, the photos or the videos are saved.

Alternatively, after the server determines that the PTU device succeeds in uploading the images or videos, or the field maintenance personnel is the technical personnel, and have the permission to upload, the photos or the videos may be saved in the database of the server.

At S411, the upload fails.

Alternatively, if the field maintenance personnel do not have the permission to upload, or the audit of the uploaded images or videos is not passed, the server determines that the PTU device fails to upload the images or videos.

At S412, the photos or the videos are deleted.

Alternatively, after determining that the PTU device fails to upload the images or videos, the server deletes the images or videos uploaded by the PTU device.

Figure 5:
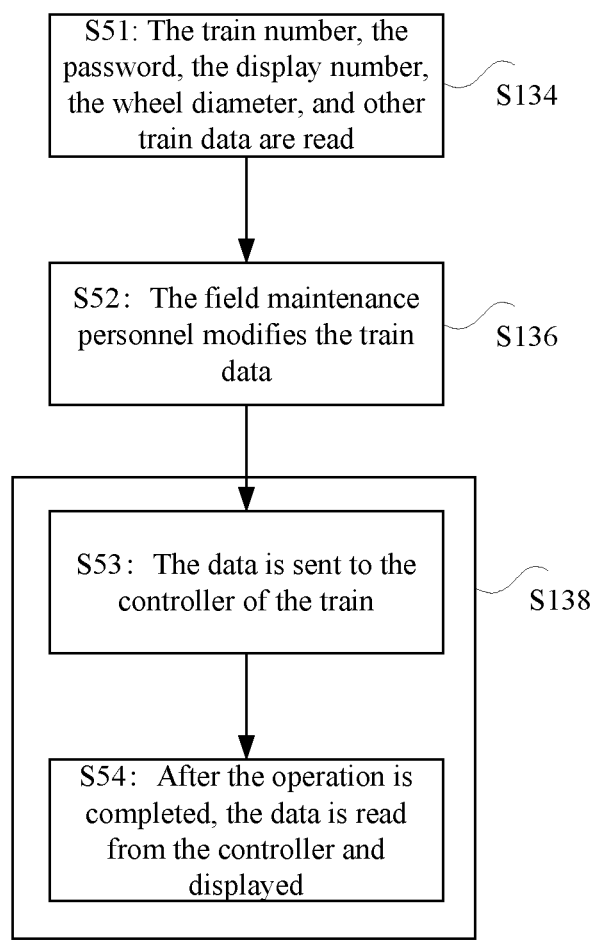
FIG. 5 is an alternative flowchart of modifying train data according to an embodiment of the disclosure.

As shown in FIG. 5, the method may include the following steps.

At S51, the train number, the password, the display number, the wheel diameter, and other train data are read.

At S52, the field maintenance personnel modifies the train data.

At S53, the data is sent to the controller of the train.

At S54, after the operation is completed, the data is read from the controller and displayed.

Alternatively, the field maintenance personnel may read, through the PTU device, the train data in the controller of the rail vehicle, and display it. After modifying the train data through the PTU device, the field maintenance personnel return the modified train data to the controller of the rail vehicle, and display it.

Figure 6:
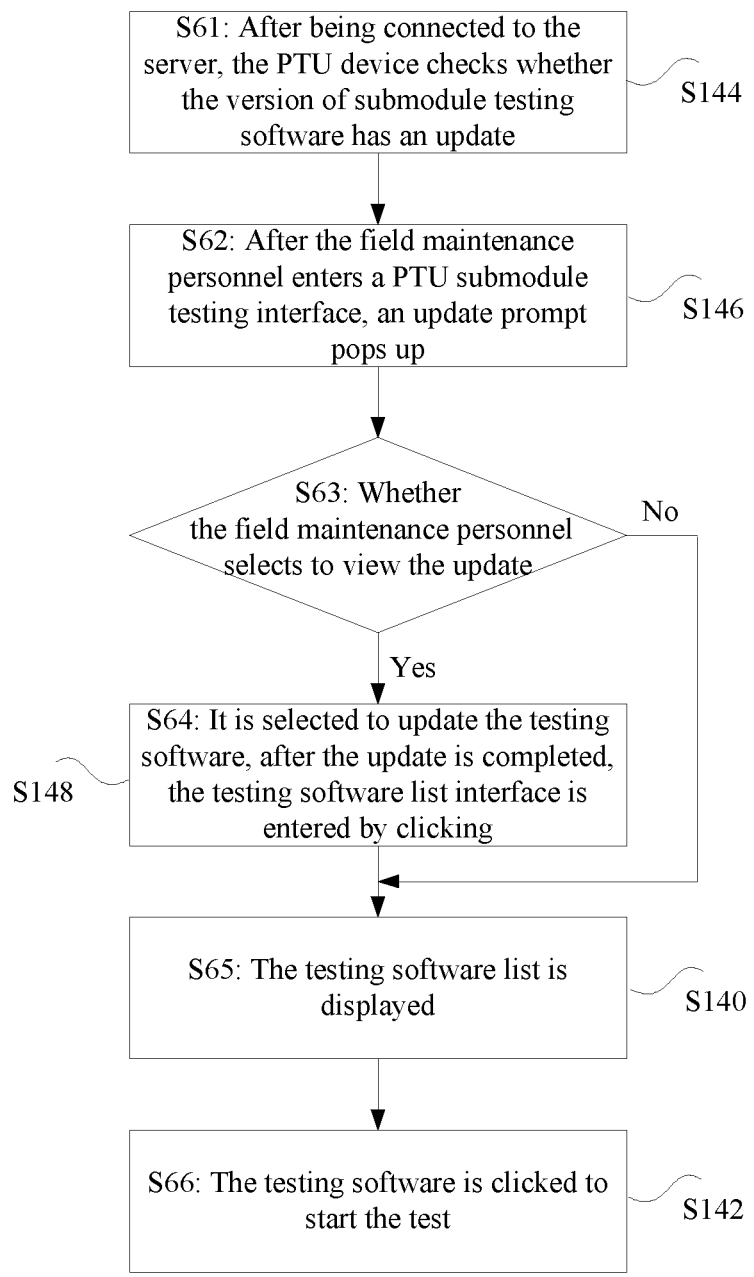
FIG. 6 is an alternative flowchart of updating testing software according to an embodiment of the disclosure.

As shown in FIG. 6, the method may include the following steps.

At S61, after being connected to the server, the PTU device checks whether the version of submodule testing software has an update.

At S62, after the field maintenance personnel enters a PTU submodule testing interface, an update prompt pops up.

At S63, it is determined whether the field maintenance personnel selects to view the update.

Alternatively, if the field maintenance personnel selects to view the update, namely clicking the update prompt, the process proceeds to S64; if the field maintenance personnel do not select to view the update, namely not clicking the update prompt, the process proceeds to S65.

At S64, it is selected to update the testing software; after the update is completed, the testing software list interface is entered by clicking.

Alternatively, after clicking the update prompt, the field maintenance personnel may select the testing software needing to be updated; after the update of the testing software is completed, the testing software list interface may be entered by clicking.

At S65, the testing software list is displayed.

Alternatively, after the testing software list interface is entered, the PTU device displays the testing software list.

At S66, the testing software is clicked to start the test.

Alternatively, the field maintenance personnel may click any piece of testing software in the testing software list to start the corresponding test.

Figure 7:
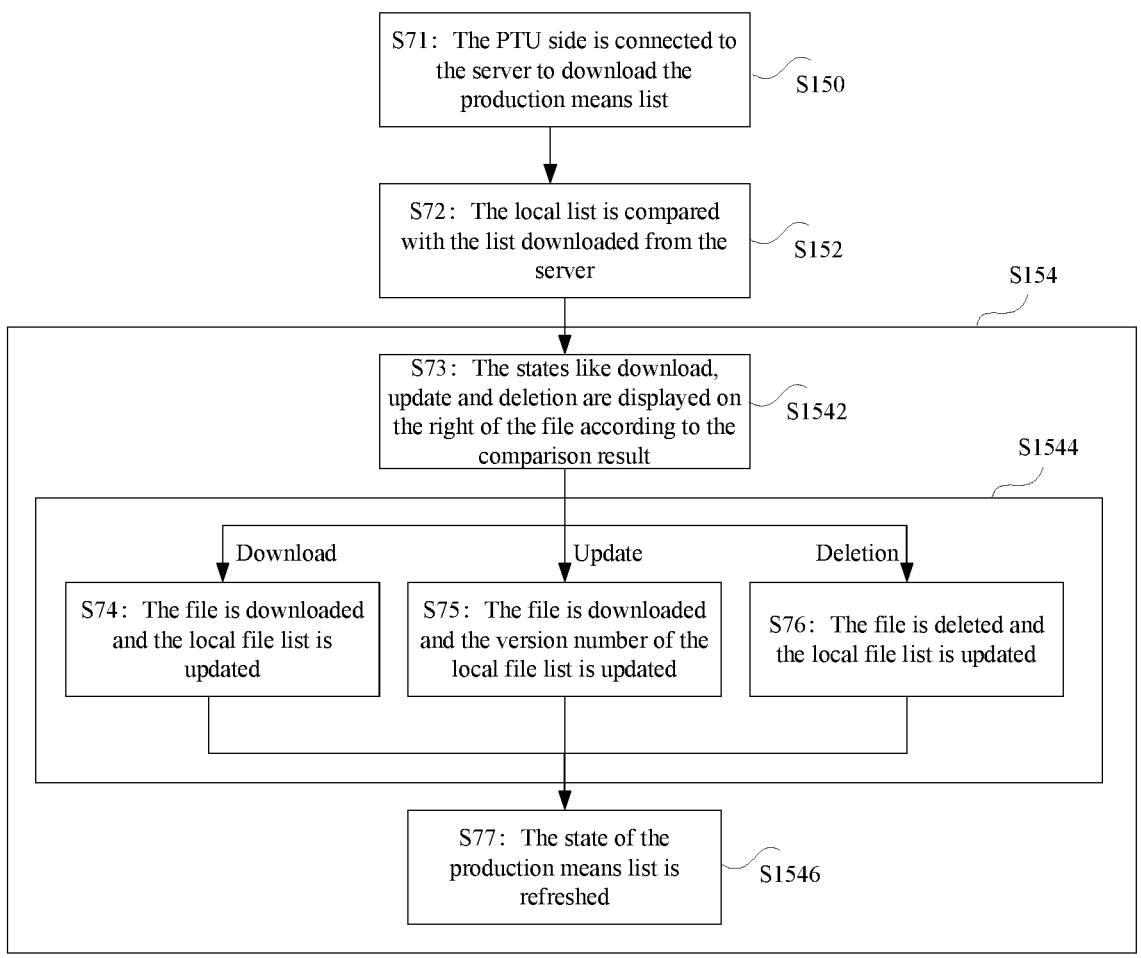
FIG. 7 is an alternative flowchart of updating a local production means list according to an embodiment of the disclosure.

As shown in FIG. 7, the method may include the following steps.

At S71, the PTU side is connected to the server to download the production means list.

Alternatively, after connecting the PTU device with the server, the field maintenance personnel may download the latest production means list from the server.

At S72, the local list is compared with the list downloaded from the server.

Alternatively, it may be determined whether the local list needs to be updated by comparing the list and the version number, and the corresponding comparison result is obtained.

At S73, the states like download, update and deletion are displayed on the right of the file according to the comparison result.

Alternatively, when the local list is lack of files, the name of the missing file may be displayed, the state of download may be displayed on the right of the file, and the process proceeds to S74. When the file in the local list needs to be updated, the state of update may be displayed on the right of the file needing to be updated, and the process proceeds to S75. When there is redundant file in the local list, the state of deletion may be displayed on the right of the redundant file.

At S74, the file is downloaded and the local file list is updated.

Alternatively, when the file displays the state of download, the user may click the download button to download the file from the server and update the local list.

At S75, the file is downloaded and the version number of the local file list is updated.

Alternatively, when the file displays the state of update, the user may click an update button to download the file from the server and update the version number of the local file list.

At S76, the file is deleted and the local file list is updated.

Alternatively, when the file displays the state of deletion, the user may click the deletion button to delete the local file and update the local list.

At S77, the state of the production means list is refreshed.

Alternatively, after the file is downloaded, updated or deleted, the state of the local production means list may be refreshed, and the corresponding state is not displayed on the right of the file.

Figure 8:
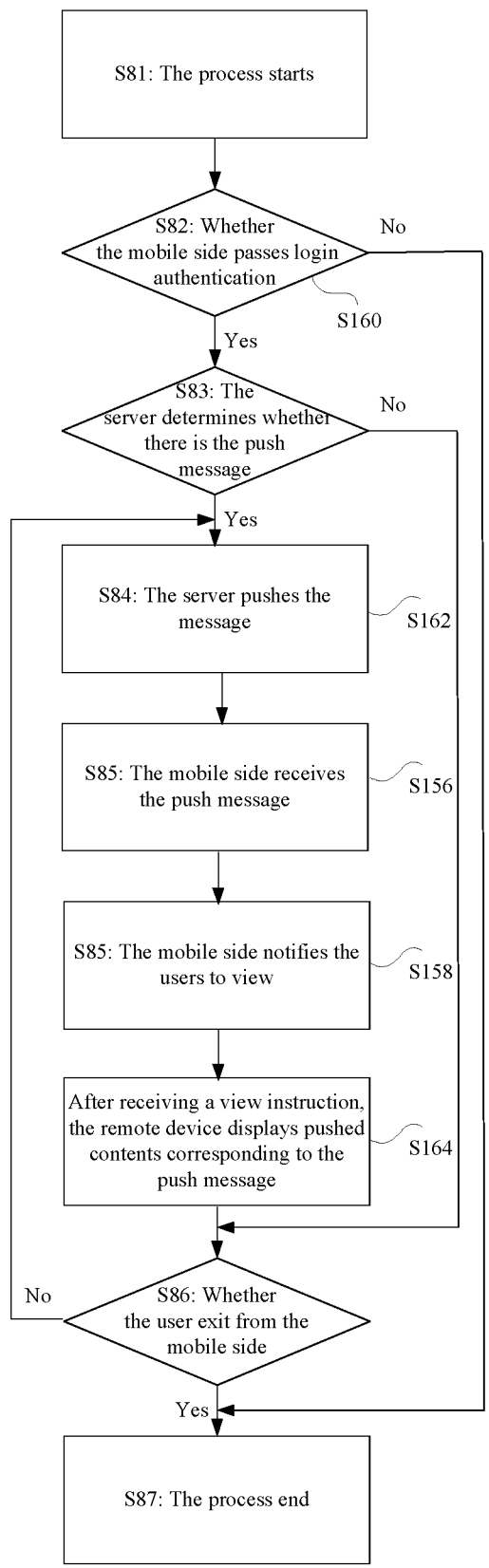
FIG. 8 is an alternative flowchart of pushing a message by a server according to an embodiment of the disclosure.

As shown in FIG. 8, the method may include the following steps.

At S81, the process starts.

At S82, whether the mobile side passes login authentication.

Alternatively, the mobile side device may log in the server side, and the server side performs the login authentication. If the login authentication of the mobile side device is successful, the process proceeds to S83. If the login authentication of the mobile side device fails, the process proceeds to S87.

At S83, the server determines whether there is the push message.

Alternatively, the server determines whether there is the push message; if so, the process proceeds to S84; if no, the process proceeds to S86.

At S84, the server pushes the message.

Alternatively, the server pushes a new push message or the push message before the mobile side device logs in to the mobile side device.

At S85, the mobile side receives the push message, and notifies the users to view.

Alternatively, the mobile side device may receive the push message through the network interface, and after receiving the push message, may pop up the note to notify the users that there is the new push message arriving; then, the users may click the note to view.

At S86, whether the user exit from the mobile side.

Alternatively, it is determined whether the users exit from the mobile side device; if the users exit from the mobile side, the process proceeds to S87; if the users do not exit from the mobile side device, the process proceeds to S84.

At S87, the process ends.

The disclosure has the following advantages: (1) true real-time processing; (2) building a fault knowledge base management system; (3) supporting remote guidance from the expert; (4) supporting that the Web side (a backstage management system and the knowledge base management system), the PTU side (train test and production support), and the mobile side (information push) monitor the rail vehicle at the same time.

Second Embodiment

According to the embodiments of the disclosure, an embodiment of a system for monitoring a rail vehicle is provided.

Figure 9:
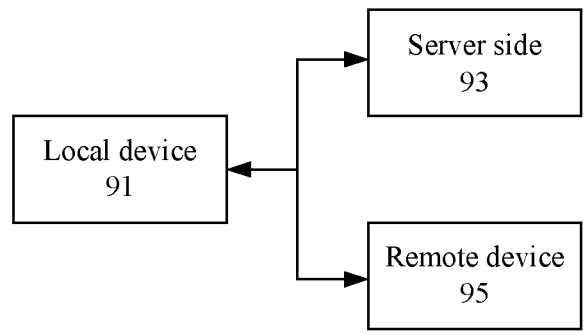
FIG. 9 is a schematic diagram of a system for monitoring a rail vehicle according to an embodiment of the disclosure.

FIG. 9 is a schematic diagram of a system for monitoring a rail vehicle according to an embodiment of the disclosure. As shown in FIG. 9, the system includes a local device and a server side or a remote device.

The local device 91 is connected with the controller of the rail vehicle, and is configured to acquire the current operating data and the historical operating data of the rail vehicle from the controller, and obtain the fault information according to the current operating data and the historical operating data, wherein the fault information includes at least one of the fault code and the fault description; the local device is the portable testing device.

Specifically, the local device 91 may be the portable testing device, for example, the portable laptop, on which the PTU service software is installed. The current operating data and the historical operating data may include the driver instruction, the train speed, the motor voltage, the motor current, and other process data, and may also include the state information of the rail vehicle, for example, emergency braking, and automatic tripping of the high-speed circuit breaker. The fault information may include: the fault code, the fault description, the fault level, the fault date, and the number of the rail vehicle having a fault.

In an alternative solution, the field maintenance personnel may carry the PTU device to the train, and then directly connects the PTU device with the controller of the rail vehicle, reads the current operating data and the historical operating data of the rail vehicle from the controller, analyzes the current operating data and the historical operating data, and diagnoses the fault information of the rail vehicle to obtain the fault information of the rail vehicle.

The server side 93 or the remote device 95 is connected with the local device 91, and is configured to send the maintenance plan corresponding to the fault information.

Figure 10:
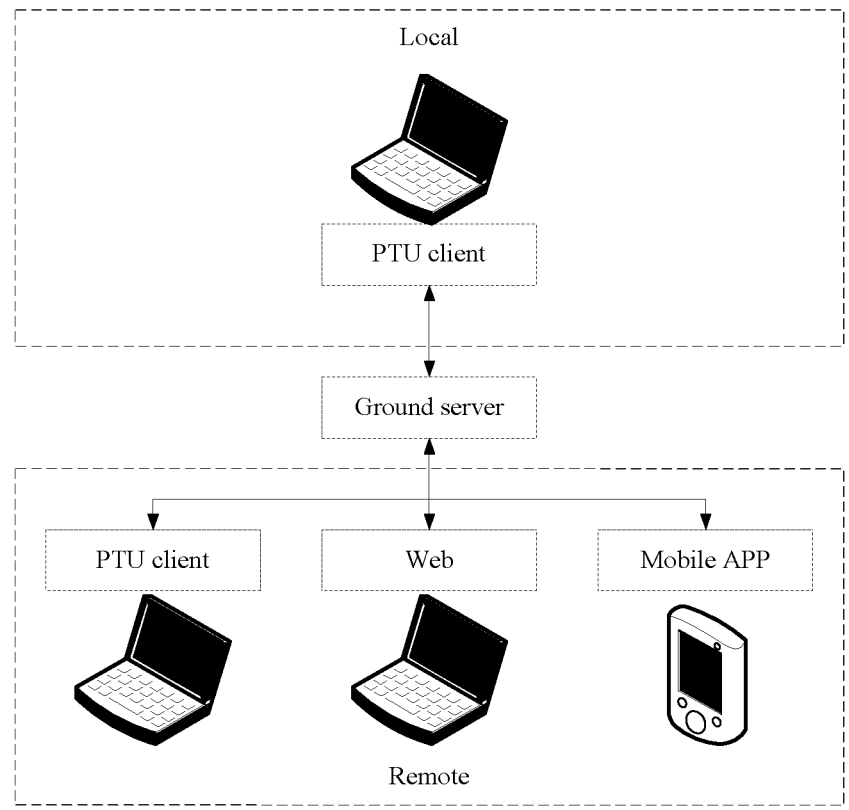
FIG. 10 is an alternative schematic diagram of the system for monitoring a rail vehicle according to an embodiment of the disclosure.

Alternatively, the remote device 95 may be one of the following: the portable testing device, the webpage side device, and the mobile side device. For example, the portable testing device may be the portable laptop on which the PTU service software is installed; the webpage side device may be the portable laptop, the tablet PC, the IPAD or the PDA; the mobile side device may be the smartphone (including the Android phone or the iOS phone), the tablet PC or the PDA. As shown in FIG. 10, a local PTU client may be connected, through the ground server, with a remote PTU client, a Web and a mobile APP.

In an alternative solution, after the field maintenance personnel obtain the fault information of the rail vehicle, if the field maintenance personnel encounter a problem that is difficult to solve, they may input the fault code; then, the PTU device queries the corresponding maintenance case from the database of the server side, and acquires the data of the maintenance case from the server side. When encountering the problem difficult to solve, the field maintenance personnel may also connect the remote device to apply for the expert to perform the remote maintenance, and obtain the maintenance plan.

The local device 91 is further configured to maintain the rail vehicle according to the maintenance plan.

In an alternative solution, after the PTU device receives the maintenance plan returned by the server side or the remote device, the maintenance plan may be displayed on the display of the PTU device for the field maintenance personnel to view. The field maintenance personnel may maintain the rail vehicle according to the maintenance plan, thereby eliminating the fault of the rail vehicle.

According to the above embodiment of the disclosure, the local device acquires the current operating data and the historical operating data of the rail vehicle, obtains the fault information according to the current operating data and the historical operating data, obtains the maintenance plan corresponding to the fault information through the remote device or the server side, and maintains the rail vehicle according to the maintenance plan, thereby implementing the monitoring and maintenance to the rail vehicle. It is easy to be noted that after obtaining the fault information, the local device may obtain the maintenance plan corresponding to the fault information through the server side or the remote device, so in case of a problem, the maintenance plan may be obtained timely, a solution may be sought conveniently and efficiently, and the technical problem in the traditional art that a troubleshooting process of a rail vehicle is difficult, and when the rail vehicle has a fault, the fault cannot be solved timely. Therefore, an effect of finding out and solving the fault of a rail vehicle in time may be achieved through the solution provided by the embodiments of the disclosure.

Each of function units provided in the embodiments of the application may run in a mobile terminal, a computer terminal or similar operating devices, and may also be stored as a part of storage media.

So, the embodiments of the disclosure may provide a computer terminal. The computer terminal may be any computer terminal device in a group of computer terminals. Alternatively, in the embodiment, the computer terminal may also be replaced with the mobile terminal and other terminal devices.

Alternatively, in the embodiment, the computer terminal may be in at least one of multiple network devices of a computer network.

In the embodiment, the computer terminal may execute program codes of the following steps in the method for monitoring a rail vehicle; the local device acquires the current operating data and the historical operating data of the rail vehicle from the controller of the rail vehicle, herein the local device, which is connected with the controller, is the portable testing device; the local device obtains the fault information according to the current operating data and the historical operating data, herein the fault information includes at least one of the fault code and the fault description; the local device obtains the maintenance plan corresponding to the fault information, herein the maintenance plan is obtained through the remote device or the server side; and the local device maintains the rail vehicle according to the maintenance plan.

Alternatively, the computer terminal may include: one or more than one processor, a memory and a transmission device.

The memory may be configured to store a software program and module, for example, a program instruction/module corresponding to the method for monitoring a rail vehicle and the device in the embodiments of the disclosure; the processor executes various function applications and data processing by running the software program and module stored in the memory, namely implementing the method for monitoring a rail vehicle. The memory may include a high-speed Random Access Memory (RAM), and may also include a nonvolatile memory, for example, one or more than one magnetic storage device, flash memory, or other nonvolatile solid state memory. In some examples, the memories may further include memories remotely set relative to the processor, and these remote memories may be connected to the terminal through the network. The examples of the network include, but not limited to, Internet, Intranet, LAN, mobile communication networks and a combination of them.

The transmission device is configured to receive or send data via a network. The specific examples of the network may include a wired network and a wireless network. In an example, the transmission device includes a Network Interface Controller (NIC), which may be connected with other network devices and routers through network cables to communicate with the Internet or the LAN. In an example, the transmission device is a Radio Frequency (RF) module, which is configured to communicate with the Internet wirelessly.

Particularly, the memory is configured to store a preset action condition, the current operating data, the historical operating data, the fault information, the maintenance plan, and an application program.

The processor may call through the transmission device the information and the application program stored in the memory, so as to execute the program codes of the steps in each alternative or preferred embodiment of the method.

Those of ordinary skill in the art may understand that the computer terminal may also be the smartphone (such as the Android phone and the iOS phone), the tablet PC, the IPDA, the Mobile Internet Device (MID), the PAD and other terminal devices.

Those of ordinary skill in the art may understand that all or part of the steps in the method of the above embodiments may be performed by hardware related to the terminal devices instructed by a program. The program may be stored in computer readable storage media. The storage media may include: a flash disk, a Read-Only Memory (ROM), an RAM, a magnetic disk or a compact disc.

The embodiments of the disclosure also provide a storage medium. Alternatively, in the embodiment, the storage medium may be configured to store the program codes executed by the method for monitoring a rail vehicle which is provided by the embodiment of the method and the embodiment of the device.

Alternatively, in the embodiment, the storage medium may be in any one of a group of computer terminals in a computer network, or any one of a group of mobile terminals.

Alternatively, in the embodiment, the storage medium is configured to store the program codes used for performing the following steps: the local device acquires the current operating data and the historical operating data of the rail vehicle from the controller of the rail vehicle, herein the local device, which is connected with the controller, is the portable testing device; the local device obtains the fault information according to the current operating data and the historical operating data, herein the fault information includes at least one of the fault code and the fault description; the local device obtains the maintenance plan corresponding to the fault information, herein the maintenance plan is obtained through the remote device or the server side; and the local device maintains the rail vehicle according to the maintenance plan.

Alternatively, in the embodiment, the storage medium may be further configured as the program codes of the steps in each alternative or preferred embodiment of the method for monitoring a rail vehicle.

The method and device for monitoring a rail vehicle according to the disclosure are exemplarily described above with reference to the accompanying drawings. However, those skilled in the art should understand that for the method and device for monitoring a rail vehicle presented in the disclosure, various improvements may also be made on the basis of not departing from the contents of the disclosure. Therefore, the protection scope of the disclosure should be determined by the contents of the claims attached.

The sequence numbers of the embodiments of the disclosure are just for describing, instead of representing superiority-inferiority of the embodiments.

In the above embodiments of the disclosure, the descriptions of the embodiments focus on different aspects. A part which is not described in a certain embodiment in detail may refer to the related description of the other embodiments.

In the several embodiments provided in the application, it should be understood that the technical contents disclosed may be realized in other ways. Herein, the embodiment of the device described above is only schematic; for example, the division of the units is only a division of logical functions, and there may be other dividing modes during the actual implementation, for example, multiple units or components may be combined or integrated to another system, or some features may be ignored or are not executed. In addition, coupling, direct coupling, or communication connection shown or discussed may be implemented through indirect coupling or communication connection of some interfaces, units or modules, and may be in an electrical form or other forms.

The units described as separate parts may be or may not be separate physically. The part shown as the unit may be or may not be a physical unit, that is to say, it may be in a place or distributed on multiple network units. It is possible to select, according to the actual needs, part or all of the units to achieve the objective of the solutions in the disclosure.

Moreover, all the function units in the embodiments of the disclosure may be integrated in a processing unit; or the units exist separately and physically; or two or more than two units are integrated in a unit. The integrated unit may be realized in form of hardware or in form of software function unit.

If the integrated unit is implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage media include: a USB flash disk, an ROM, an RAM, a mobile hard disk, a magnetic disk or a compact disc, and other media which can store program codes.

The above is only the preferred embodiments of the disclosure; it should be indicated that, on the premise of not departing from the principles of the disclosure, those of ordinary skill in the art may also make a number of improvements and supplements, and these improvements and supplements should fall within the protection scope of the disclosure.

What is claimed is:

1. A method for monitoring a rail vehicle, comprising:
acquiring, by a local device, current operating data and historical operating data of the rail vehicle from a controller of the rail vehicle, wherein the local device, which is directly connected with the controller, is a portable testing device, a Portable Testing Unit (PTU) service software is installed on the local device;
generating, by the local device, fault information according to the current operating data and the historical operating data, wherein the fault information comprises at least one of a fault code and a fault description;
obtaining, by the local device, a maintenance plan corresponding to the fault information, wherein in response to the connection between the local device and a server side through a wireless network, the maintenance plan is obtained through the server side and is displayed on the local device, the local device is configured to use a function of a train debugging test that comprises querying or setting a controller variable, guiding test personnel to operate the rail vehicle; and
maintaining, by the local device, the rail vehicle according to the maintenance plan;
wherein obtaining the maintenance plan through the server side comprises:
sending, by the local device, the fault code to the server side, wherein the server side queries according to the fault code to obtain a corresponding first maintenance resource, wherein the first maintenance resource comprises at least one of a video resource and an image resource; and receiving, by the local device, the first maintenance resource returned by the server side;

wherein after receiving, by the local device, the maintenance resource returned by the server side, and in response to fulfilling a task of maintaining the rail vehicle according to the maintenance plan, the method further comprises:

acquiring, by the local device, a second maintenance resource in a maintenance process, wherein the second maintenance resource comprises at least one of the video resource and the image resource, the maintenance process is used for characterizing the process of maintaining the rail vehicle according to the maintenance plan; and uploading, by the local device, the second maintenance resource to the server side, wherein the server side stores the second maintenance resource, wherein the second maintenance resource corresponds to the fault information, wherein before storing, by the server side, the second maintenance resource, the method further comprises:

sending, by the server side, the second maintenance resource to a remote device;

generating, by the remote device, an audit result according to the second maintenance resource, and the audit result comprises one of the following: the audit is passed, and the audit is not passed;

receiving, by the server side, the audit result sent by the remote device;

if the audit result is the audit is passed, storing, by the server side, the second maintenance resource; and if the audit result is the audit is not passed, deleting, by the server side, the second maintenance resource.

2. The method as claimed in claim 1, wherein in response to the connection between the local device and a remote device through a wireless network, the maintenance plan is obtained through the remote device, obtaining the maintenance plan through the remote device comprises:

establishing, by the local device, a connection with the remote device, wherein the remote device is one of the portable testing device, a Web side device, and a mobile side device;

sending, by the local device, the current operating data to the remote device; and receiving, by the local device, maintenance data sent by the remote device, wherein the maintenance data comprises one of a controller variable and software data.

3. The method as claimed in claim 2, wherein establishing, by the local device, the connection with the remote device comprises:

sending, by the local device, a maintenance request carrying the fault description to the server side, wherein the server side sends the maintenance request to the remote device;

receiving, by the local device, a connection request sent by the remote device; and confirming, by the local device, the connection request, and establishing the connection with the remote device.

4. The method as claimed in claim 2, wherein establishing, by the local device, the connection with the remote device comprises:

sending, by the local device, a maintenance request carrying the fault description to the remote device;

receiving, by the local device, a connection request sent by the remote device; and confirming, by the local device, a connection request, and establishing the connection with the remote device.

5. The method as claimed in claim 2, wherein before receiving, by the local device, the maintenance data sent by the remote device, the method further comprises:

receiving, by the local device, a first random code sent by the remote device;

matching, by the local device, the first random code to a second random code stored locally; and if there is a match, receiving, by the local device, the maintenance data sent by the remote device;

wherein, the first random code and the second random code are generated by the server side.

6. The method as claimed in claim 1, wherein after sending, by the local device, the fault code to the server side, the method further comprises:

performing, by the server side, permission validation to the local device; and if the permission validation of the local device is successful, querying, by the server side, according to the fault code to obtain the first maintenance resource.

7. The method as claimed in claim 1, wherein before acquiring, by the local device, the current operating data and the historical operating data of the rail vehicle, the method further comprises:

sending, by the controller of the rail vehicle, the current operating data to the server side, wherein the server side determines, according to the current operating data and the historical operating data, whether the rail vehicle has a fault.

8. The method as claimed in claim 7, wherein before acquiring, by the local device, the current operating data and the historical operating data of the rail vehicle, the method further comprises:

acquiring, by the local device, train data sent by the controller of the rail vehicle, wherein the train data comprises at least one of the following: a number, password, display screen number and wheel diameter of the rail vehicle;

modifying, by the local device, the train data, and obtaining modified train data; and returning, by the local device, the modified train data to the controller, wherein the controller displays the modified train data.

9. The method as claimed in claim 7, wherein before acquiring, by the local device, the current operating data and the historical operating data of the rail vehicle, the method further comprises:

displaying, by the local device, a testing software list interface of testing software, wherein names of multiple pieces of testing sub-software are displayed in the testing software list; and receiving, by the local device, the name of selected testing sub-software, and performing a test corresponding to the selected testing sub-software.

10. The method as claimed in claim 9, wherein before displaying, by the local device, the testing software list interface of the testing software, the method further comprises:

after being connected with the server side, detecting, by the local device, whether the testing software needs to be updated;

if it is detected that the testing software needs to be updated, displaying, by the local device, an update prompt in a testing interface; and after receiving an update instruction, updating, by the local device, the testing software.

11. The method as claimed in claim 7, wherein before acquiring, by the local device, the current operating data and the historical operating data of the rail vehicle, the method further comprises:
receiving, by the local device, a first production means list sent by the server side, wherein the first production means list comprises at least two first production means files;
comparing, by the local device, the first production means list with a second production means list, and obtaining a comparison result, wherein the second production means list comprises at least two second production means files;
updating, by the local device, the second production means list according to the comparison result;
wherein, each first production means file and each second production means file comprise at least one of the following: a CAD drawing, a maintenance manual, a quality manual, and an instruction book.

12. The method as claimed in claim 11, wherein updating, by the local device, the second production means list according to the comparison result comprises:
marking, by the local device, state information of a second production means to be processed according to the comparison result, wherein the state information is a document processing action comprising one of download, update and deletion, marking state information by displaying a button, and when the button is triggered, processing, by the local device, the second production means to be processed according to the state information;
updating, by the local device, the second production means list.

13. The method as claimed in claim 7, wherein after determining that the rail vehicle has a fault, the method further comprises:
receiving, by a remote device, a push message of the server side, wherein the push message comprises at least one of a fault message and a check-out and check-in message; and
displaying, by the remote device, the push message.

14. The method as claimed in claim 13, wherein before receiving, by the remote device, the push message of the server side, the method further comprises:
validating, by the server side, the remote device;
if the remote device is validated successfully, pushing, by the server side, the corresponding push message to the remote device, wherein the push message at least comprises: a historical push message, the historical push message is a push message before a login to the remote device.

15. The method as claimed in claim 13, wherein after displaying, by the remote device, the push message, the method further comprises:
after receiving a view instruction, displaying, by the remote device, pushed contents corresponding to the push message;
wherein, the pushed contents corresponding to the push message at least comprise: the fault code, the fault description, a fault level, a fault vehicle, a fault device, time of fault occurring, and a fault guidance; the pushed contents corresponding to the check-out and check-in message at least comprise: a serial number of a train, a train number, a train model, and check-out and check-in time of a train.

16. A system for monitoring a rail vehicle, comprising:
a local device, which is a local portable device that is directly connected with a controller of the rail vehicle, on which is installed a Portable Testing Unit (PTU) service software, and is configured to acquire current operating data and historical operating data of the rail vehicle from the controller, and generate fault information according to the current operating data and the historical operating data, wherein the fault information comprises a fault code and a fault description;
a server side that in response to connection with the local device through a wireless network, is configured to send a maintenance plan corresponding to the fault information to the local device;
the local device is further configured to display the maintenance plan and maintain the rail vehicle according to the maintenance plan, wherein the local device is configured to use a function of a train debugging test, the function of the train debugging test comprises querying or setting a controller variable, guiding test personnel to operate the rail vehicle;
wherein the local device is further configured to send the fault code to the server side;
the server side is further configured to query according to the fault code to obtain a corresponding first maintenance resource, wherein the first maintenance resource comprises at least one of a video resource and an image resource;
the local device is further configured to receive the first maintenance resource returned by the server side;
wherein the local device is further configured to after receiving the maintenance resource returned by the server side, and in response to fulfilling a task of maintaining the rail vehicle according to the maintenance plan, acquire a second maintenance resource in a maintenance process, and upload the second maintenance resource to the server side, wherein the second maintenance resource comprises at least one of the video resource and the image resource and corresponds to the fault information, the maintenance process is used for characterizing the process of maintaining the rail vehicle according to the maintenance plan; and
the server side is further configured to store the second maintenance resource in accordance with a procedure comprising:
sending, by the server side, the second maintenance resource to a remote device;
generating, by the remote device, an audit result according to the second maintenance resource, and the audit result comprises one of the following: the audit is passed, and the audit is not passed;
receiving, by the server side, the audit result sent by the remote device;
if the audit result is the audit is passed, storing, by the server side, the second maintenance resource; and
if the audit result is the audit is not passed, deleting, by the server side, the second maintenance resource.

17. The system as claimed in claim 16, wherein in response to the system comprising a remote device, the remote device is connected with the local device through a wireless network, and is one of the portable testing device, a Web side device, and a mobile side device.

* * * * *